United States Patent
Van Der Zande et al.

(10) Patent No.: US 10,229,078 B2
(45) Date of Patent: Mar. 12, 2019

(54) MULTI-MASTER BUS

(71) Applicant: PHILIPS LIGHTING HOLDING B.V., Eindhoven (NL)

(72) Inventors: Alexander Abraham Cornelius Van Der Zande, Eindhoven (NL); Jurgen Mario Vangeel, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 47 days.

(21) Appl. No.: 15/109,710

(22) PCT Filed: Dec. 26, 2014

(86) PCT No.: PCT/EP2014/079344
§ 371 (c)(1),
(2) Date: Jul. 5, 2016

(87) PCT Pub. No.: WO2015/104193
PCT Pub. Date: Jul. 16, 2015

(65) Prior Publication Data
US 2016/0328346 A1  Nov. 10, 2016

(30) Foreign Application Priority Data
Jan. 10, 2014  (EP) .................................. 14150702

(51) Int. Cl.
*G06F 13/364* (2006.01)
*G06F 13/42* (2006.01)
(52) U.S. Cl.
CPC ........ *G06F 13/364* (2013.01); *G06F 13/4282* (2013.01); *G06F 13/4291* (2013.01)

(58) Field of Classification Search
CPC . G06F 13/364; G06F 13/4282; G06F 13/4291
See application file for complete search history.

(56) References Cited

U.S. PATENT DOCUMENTS 5,751,220 A * 5/1998 Ghaffari ............. G07C 9/00111
340/10.2
5,831,848 A * 11/1998 Rielly ................ G05B 19/0421
700/3

(Continued)

FOREIGN PATENT DOCUMENTS

| CN | 1659519 A | 8/2005 |
| JP | 2011070282 A | 4/2011 |
| WO | 2005119448 A1 | 12/2005 |

*Primary Examiner* — Henry Tsai
*Assistant Examiner* — John B Roche

(57) ABSTRACT

Multiple master modules are connected to a bus, each having bus communication logic for initiating a transaction over the bus. The bus communication logic is able to detect when the bus is busy (or apparently busy), and in response will wait before initiating a transaction of its own. Further, a distributed reset sub-system is provided, comprising an instance of a reset mechanism at each of a plurality of the master modules. Each reset mechanism recognizes a timeout condition indicative of the detected busy state being due to error, and in response performs a staged reset. This reset process first attempts a local reset which resets the respective bus communication logic of its respective master module. If the local reset fails to clear the error, the staged reset process then attempts one or more further resets to reset bus communication logic of one or more other modules connected to the bus.

16 Claims, 4 Drawing Sheets

(56) References Cited

U.S. PATENT DOCUMENTS

| | | | |
|---|---|---|---|
| 6,021,453 A * | 2/2000 | Klingman | H04L 12/40123 710/305 |
| 6,496,890 B1 | 12/2002 | Azevedo et al. | |
| 6,735,720 B1 | 5/2004 | Dunn et al. | |
| 2002/0108076 A1 | 8/2002 | Barenys et al. | |
| 2007/0240019 A1 * | 10/2007 | Brady | G06F 13/4291 714/43 |
| 2010/0180162 A1 * | 7/2010 | Cardwell | G06F 11/0745 714/47.1 |
| 2011/0276726 A1 | 11/2011 | Sato | |

* cited by examiner

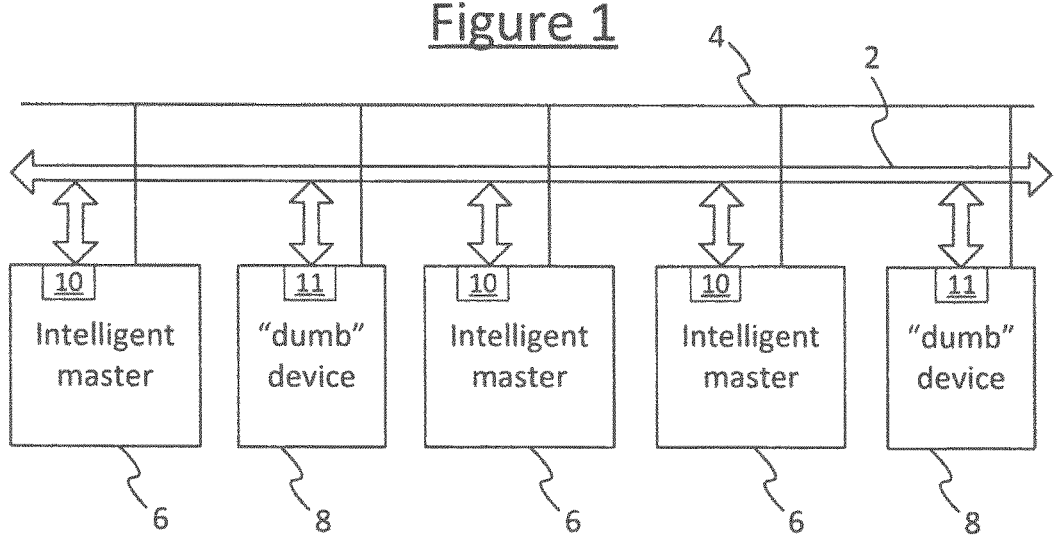
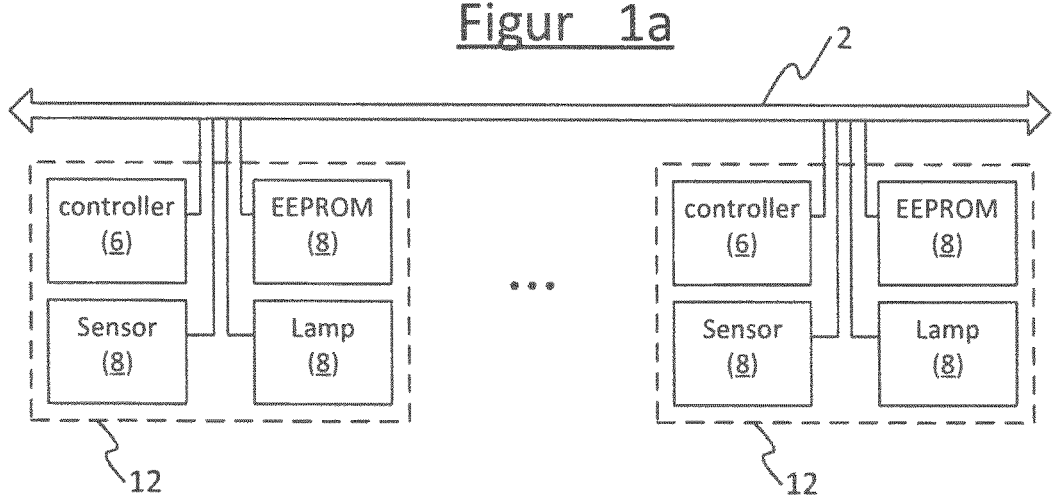
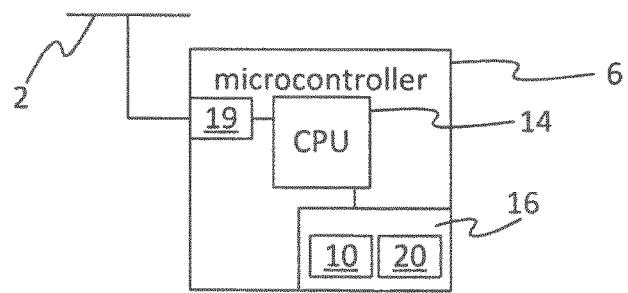

MULTI-MASTER BUS

CROSS-REFERENCE TO PRIOR APPLICATIONS

This application is the U.S. National Phase application under 35 U.S.C. § 371 of International Application No. PCT/EP2014/079344, filed on Dec. 26, 2014, which claims the benefit of European Patent Application No. 14150702.0 filed on Jan. 10, 2014. These applications are hereby incorporated by reference herein.

TECHNICAL FIELD

The present disclosure relates to a communication bus and bus protocol allowing multiple modules to be masters, i.e. to initiate transactions over the bus.

BACKGROUND

I²C is a type of serial computer bus that can be used to attach low-speed peripherals to a motherboard, embedded system, cell phone, or other electronic device. Typically I²C is used on a printed circuit board (PCB) to connect a limited number of slave devices to one master microcontroller. Nonetheless, the I²C protocol does allow for multiple masters, i.e. multiple modules which can each initiate transactions over the bus (such as to provide an instruction or information to another module, or read information from another module). It is even possible that every participant is a master. Further, I²C can be used to connect components via cables, rather than just within one PCB.

However, scaling the system up to multiple controllers connected together using cables can greatly increase the susceptibility to external disturbances which are not known at the design stage. A design cannot guarantee the absence of disturbances on the communication lines. It is known to use "buffer" integrated circuits in cases where I²C is used for communication over longer distances, e.g. cabled communication. These buffer ICs improve reliability but add expense.

SUMMARY

It would be desirable to make interface systems such as I²C more suitable for providing communication interfaces across a wider range of applications, such as lighting control systems. This may offer advantages but also a challenge. For example, any of multiple components or even every component can become master within the system, allowing quick exchange of information at the moment it is needed without the need for polling every module time and time again. However, using multi-master systems like I²C in a noisy environment is a challenge since the communication lines may suffer from disturbances, regularly reducing the availability of the communication bus.

Such disturbances or "glitches" on a bus can cause error conditions in one or more components on the bus. For example, all I²C bus masters continually monitor the bus. When the bus is available, one of the bus masters may transmit data over the bus. The start signal of this transmission will be detected by the other bus masters, which will trigger a "bus busy" wait state in the other bus masters. This wait state will be maintained until the stop signal of the transmission is detected. So, if one or more of the bus masters interpret a glitch on the bus as the start of a transmission, those bus masters will enter the wait state as a consequence of the glitch, and then will remain in that wait state indefinitely (because there will be no corresponding transmission of a stop signal).

An error condition can also arise when disturbance on the bus causes a module to become stuck outputting some erroneous signal on the bus. For example according to the I²C protocol, a module being addressed should receive eight bits of data over eight clock pulses and then acknowledge by pulling the clock line (SCL) low on the ninth bit. If disturbance on the bus causes an extra, anomalous clock pulse to be experienced out of sync with the data, this can cause the addressed module to become stuck in a state where it continues to hold the clock line low indefinitely. Thus the bus is left stuck in an apparently "busy" state, blocking any other communication.

Similar issues may also occur in other bus systems which allow for the possibility of multiple master modules. Generally there are potentially many possible scenarios whereby a state transition that is not expected or allowed can cause a module to hang or block the bus.

Within a single master setup such issues are relatively straightforward to overcome, since a single controller decides what happens on the bus and control and intervention can readily be performed by that single controller. Using a multi master scheme on the other hand, no single controller knows whether the bus is disabled or whether another master is using the bus for valid communication. It would be desirable to try to improve the reliability in I²C based systems or other interface systems allowing multiple masters.

Hence in a system where multiple participants can be master and any can block the bus at any given time without the system or other participants able to identify that device, it would be desirable to provide a mechanism to quickly and orderly release the bus is to regain control over the communication line.

To address such issues, there is disclosed herein a fault-recovery mechanism whereby a master module responds to an error condition by following a series of successive recovery stages until the error is resolved, each stage being more severe than the last.

According to one aspect disclosed herein, there is provided a system comprising: a bus, multiple master modules connected to the bus, and a distributed reset sub-system configured to attempt multiple stages of reset.

Each of the multiple master modules comprises respective bus communication logic operable to initiate a transaction over the bus. The bus communication logic is configured to detect a busy state when another module communicates (or there is apparently another communication) over the bus. In response to detecting the busy state, the bus communication logic waits before initiating a transaction over the bus, until this state is cleared.

The distributed reset sub-system comprises an instance of a reset mechanism at each respective one of a plurality of the master modules. The reset mechanism at each master module is configured to recognize a timeout condition indicative of the detected busy state being due to error, and to perform a staged reset in response to recognizing the timeout condition. The staged reset first attempts a local reset which resets the respective bus communication logic of the respective master module. If the local reset fails to clear the error, the staged reset process subsequently attempts one or more further stages of reset, to reset bus communication logic of one or more other modules connected to the bus.

In embodiments, the one or more further reset stages may comprise at least: a reset which resets the bus communication logic of a plurality of other modules connected to the bus. This may comprise a reset which resets the bus communication logic all the modules connected to the bus.

In embodiments, the one or more further reset stages may comprise at least a hard reset of one or more of the other modules connected to said bus, the hard reset comprising a power reset and/or a reset via a pin of the respective other module.

According to some applications, the system comprises additional "dumb" functional participants on the bus—either slaves, or masters not equipped with an instance of the reset mechanism disclosed herein. This can further complicate the situation, since these devices have no possibility of detecting a problem on the bus or correcting it.

Hence in embodiments, the one or more further reset stages may comprise at least: a reset which resets one or more dumb modules connected to the bus. This may comprise a hard reset of at least the one or more of the dumb modules.

In embodiments, the staged reset may comprise at least a three-stage reset. In this case the further reset stages comprise, in turn: a soft reset which resets the bus communication logic of one or more of the other modules connected to the bus, by sending a reset signal over the bus; and subsequently, if the soft reset fails to reset the error, a hard reset of one or more of the other modules connected to said bus. The soft reset may reset all the other modules connected to the bus, which may include dumb devices of the kind mentioned above. The hard reset may reset at least one of the dumb devices. The hard reset may be signaled via a control line separate from said bus.

According to exemplary applications, the bus may comprise a cable. The cable may comprise an unshielded cable. In one particular application, the disclosed mechanism may be used in an intelligent lighting system, making use of an I$^2$C bus or the like for cabled communication between modules. It has been found that such systems are particularly susceptible to noise from other utilities such as elevators, air conditioning and/or heating. For example, the opening and closing of elevator doors has been found to cause glitches in signals carried by the cables of a lighting system. Hence in embodiments, each of a plurality of master modules connected via cable may be configured with an instance of a reset mechanism according to the disclosure herein. For example in an intelligent lighting system where each luminaire comprises a master module connected to the bus cable, each such master may be configured with an instance of the reset mechanism disclosed herein.

In embodiments, each of the master modules may comprise a processor and the reset mechanism is implemented in software run on the processor. Thus there may be provided a distributed, multi-stage reset mechanism that improved robustness without the need to add extra components which would otherwise add to BOM (bill of materials) cost.

In embodiments, the reset mechanism of each respective master module may be configured to use a respective unique timeout value to recognize said timeout condition, being unique amongst the multiple master modules connected to the bus. This way, it may be avoided that each module tries to reset at once. For example, each of the respective unique timeout values may be based on an address or serial number of the respective master module.

According to another aspect disclosed herein, there is provided a first master module for use as one of multiple master modules connected to a bus, each comprising bus communication logic operable to initiate a transaction over the bus. The respective bus communication logic of the first master module is configured to detect a busy state of the bus, and in response to refrain from initiating a transaction over the bus until the busy state is cleared. The first master module comprises a reset mechanism configured to recognize a timeout condition indicative of the detected busy state being due to error, and to perform a staged reset in response to recognizing the timeout condition. The staged reset first attempts a local reset which resets the bus communication logic of the first master module, and if the local reset fails to reset the error, subsequently attempts one or more further resets to reset bus communication logic of a plurality of other modules connected to said bus.

According to yet another aspect disclosed herein, there is provided a computer program product for operating at least a first master module being one of multiple master modules connected to a bus, each comprising bus communication logic operable to initiate a transaction over the bus. The computer program product comprises code embodied on a computer-readable medium and configured so as when executed on a processor of the first master module to perform operations of: implementing at least part of the bus communication logic of the first master module, including detecting a busy state on the bus and in response causing the bus communication logic to refrain from initiating a transaction over the bus during the busy state; recognizing a timeout condition indicative of the detected busy state being due to error; and performing a staged reset in response to recognizing the timeout condition; wherein the staged reset first attempts a local reset which resets the bus communication logic of the first master module, and if the local reset fails to reset the error, subsequently attempts one or more further resets to reset bus communication logic of a plurality of other modules connected to said bus.

BRIEF DESCRIPTION OF THE DRAWINGS

To aid understanding of the present disclosure and to show how embodiments may be put into effect, reference is made by way of example to the accompanying drawings in which:

FIG. 1 is a schematic block diagram of a bus and connected modules,

FIG. 1*a* is a schematic block diagram of a lighting system,

FIG. 2 is a schematic block diagram of a master module,

DETAILED DESCRIPTION OF EMBODIMENTS

Figure 3:
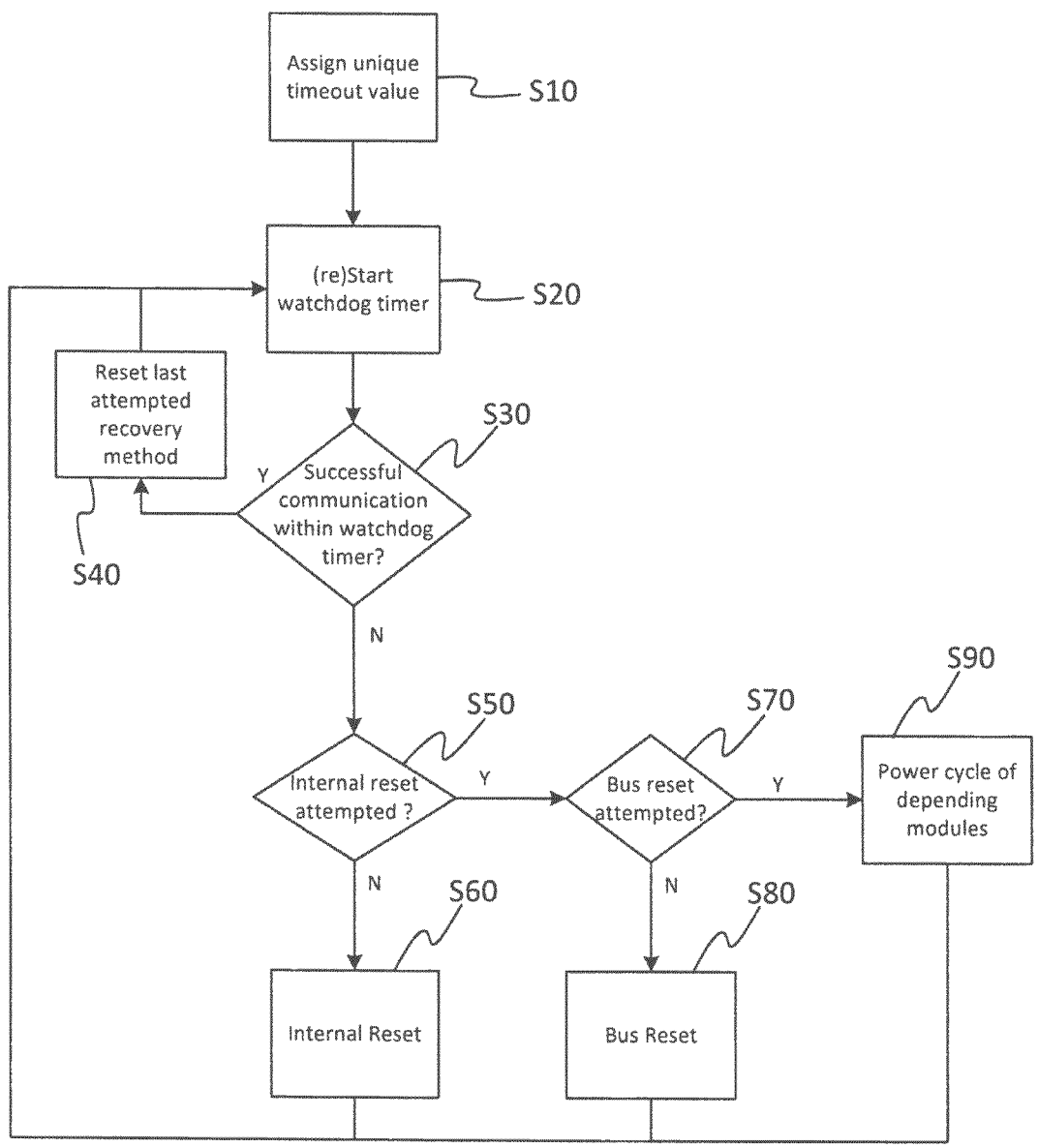
FIG. 3 is a schematic flow chart of a reset process.
Figure 4:
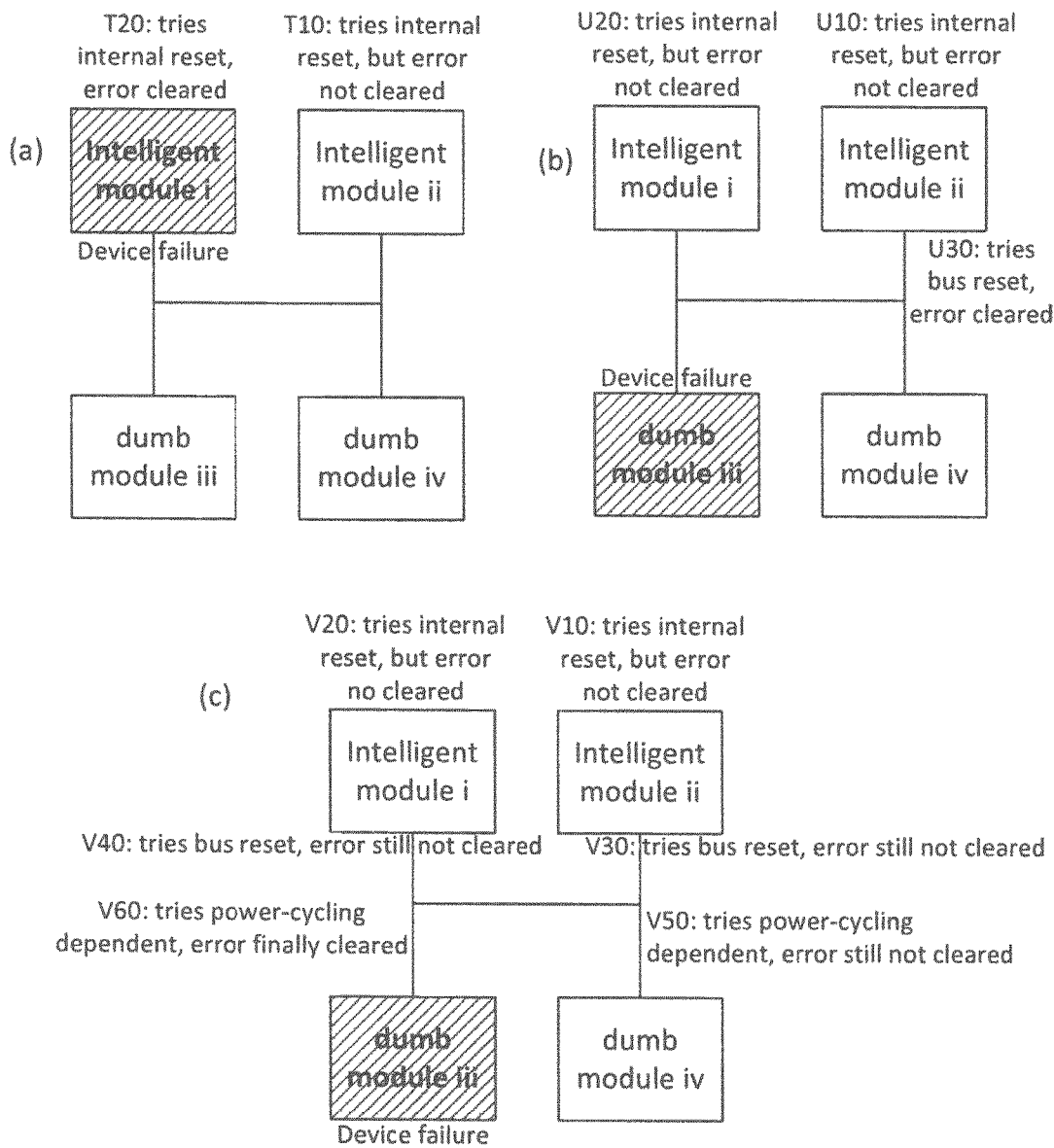
FIGS. 4*a*-4*c* schematically illustrate some example reset scenarios.

The following presents a method for quickly and reliably recovering from disturbances in an I$^2$C multi master setup or the like, thus allowing reliable communication despite disturbances that may be experienced for example in a lighting system and/or a system in which modules are connected with cables. The method allows multiple modules comprising I$^2$C enabled devices to work together to recover in an organized way after a disturbance paralyses the communication bus. The modules do not need to have prior knowledge of how the system is constructed in order to operate. The master modules each comprises at least a microcontroller running the disclosed method, and also allow for standard I$^2$C functional modules that are not necessarily configured with additional robustness measures.

The fault-recovery mechanism is implemented in each of multiple master I²C modules, whereby each of these master modules responds to an error condition by following a series of recovery steps until the error is solved, each step being more severe than the last. In embodiments the mechanism exploits the observation that, in principle the wait state should never endure longer than a period of time determined by the maximum length of the data transmission. I²C allows any length of communication, but within a given system the maximum message length may be known and the timeout is chosen to be longer than the maximum message length to allow for some safety margin.

As a first recovery step, the master module effects an internal soft reset in response to a "watchdog timer" expiring. The duration of the watchdog timer is based on the maximum length of the data transmission (plus safety margin), and optionally on one or more other, component-specific parameters. The result of the soft reset is that the master module considers the bus to be available for transmission.

As a second recovery step, effected only if the first recovery step was not shown to be successful within a predetermined period of time, the master module will attempt to reset the bus by transmitting the standard I²C bus reset (nine pulses on the clock line).

As a third recovery step, effected only if the second recovery step was not shown to be successful within a predetermined period of time, the master module will attempt to power cycle its own dependent modules in a bid to clear the error.

Some exemplary embodiments are now described in more detail in relation to FIGS. 1 to 7.

FIG. 1 illustrates a system comprising a communications bus 2 and a plurality of modules 6, 8 connected to the bus 2, such that communications between modules can be conducted according to a suitable bus protocol. In embodiments the bus 2 is an I²C bus over which communications are conducted according to the I²C protocol. A module 6, 8 that is connected to the bus 2 and arranged to transmit and/or receive messages over the bus 2 according to the relevant bus protocol may be referred to as a participant of that bus. In the present case, the bus participants comprise at least a plurality of "intelligent" master modules 6 and one or more "dumb" modules 8.

An "intelligent" module as used in the following refers to a master module which comprises an instance of the reset mechanism in accordance with embodiments disclosed herein, and which preferably comprises a microcontroller or other processor arranged to execute software for controlling one or more other modules 6, 8 connected to the bus 2. A "dumb" module refers to a slave module, or to a master module but one only configured according to standard or previously known bus techniques and not having a reset mechanism in accordance with embodiments disclosed herein. For example a "dumb" module may be a standard I²C module. The dumb module may be implemented in dedicated hardware, or in a microcontroller programmed only with limited functionality. In embodiments, one, some or all of the dumb modules 8 may be slaves. Alternatively every bus participant may be a master module. By way of example in the following, it will be assumed that each dumb module 8 is a slave. However, it will be appreciated this is not necessarily the case in all embodiments.

Each master module 6 comprises bus communication logic 10, configured to communicate with other modules 6, 8 over the bus 2 in accordance with the master status of its respective module. A master module 6 is one that can autonomously access the bus 2, i.e. can issue a message onto the bus without first being polled or receiving a request from another module connected to the bus 2. That is to say, a master 6 is a module that can initiate a transaction over the bus. The slaves 8 on the other hand can only receive messages and respond to received messages. A slave cannot initiate a transaction itself. Each slave 8 comprises (limited) bus communication logic 11 for receiving and responding to messages over the bus 2 according to the bus protocol.

As well as communicating over the bus 2, each of the modules 6, 8 also has some other functionality providing the "end use" or purpose of the module. For instance, in a lighting system, some of the modules may each comprise a respective lamp or light source arranged to illuminate a space (e.g. an indoor space such as a room, corridor, hall, theatre, shop floor, etc.; or an outdoor space such as a garden, park, stadium, etc.; or any other space such as the interior of a vehicle). One or some of the modules may comprise devices providing other kinds of functionality, such as an intelligent presence sensor. A presence sensor is a device which detects presence of a person in a space, e.g. by detecting motion and/or heat. Example technologies by which a presence sensor may operate include passive infra-red (PIR) or ultrasound. Other examples could include a memory device such as an EEPROM, and/or a controller for controlling one or more lamps and/or sensors via the bus 2.

Each master module 6 may request data from another module 6, 8 on bus 2, e.g. to request status information. Each master module may also send data to another module 6, 8 on the bus 2, e.g. to control it to provide some functionality, or to provide or store information there.

In embodiments, each module 6, 8 may also be connected to a separate power supply line 4 such as a power-over-Ethernet connection, which powers the front-end functionality of the module 6, 8. For example in the case of luminaire, this power supply 4 may be connected to the driver of the luminaire's light source(s). Alternatively some or all of the modules 6, 8 could each be provided with its own individual power supply, or a power supply could be incorporated into the communication bus 2. By whatever means the module 6, 8 is powered, the same power supply (e.g. power line 4) may also be connected to power the communication logic 10, 11. Alternatively the bus communication logic 10, 11 may be powered by a separate power supply.

An example application of the present disclosure is illustrated in FIG. 1a. Here, the system comprises a plurality of intelligent luminaires 12, each comprising a plurality of modules 6, 8 each connected to the bus 2. For example the modules 6, 8 of each luminaire may be comprised within the same housing. In the example shown, each luminaire 12 comprises a lamp or light source, a presence sensor, a memory such as an EEPROM, and a controller. Each of the light sources, sensors and memories may be implemented as a slave or dumb module 8, and each of the controllers may be implemented as an intelligent master module 6. Each master controller module 6 is primarily responsible for controlling the light source of its own respective luminaire 12 and taking sensor readings from the sensor of its own luminaire 12, though it may also be possible for a controller 6 to initiate transactions with the slave modules 8 of other luminaires 12 over the bus 2. Further, the controllers 6 can communicate with other controllers 6 over the bus 2, for example to exchange information for coordinating the operation of the luminaires 12, e.g. to turn on or dim up only those luminaires 12 where a user is determined to be present based on the sensor readings from the presence sensors, and to turn off or dim down other luminaires 12 in order to save power consumption. It will be appreciated this is only one example, and various other arrangements are possible for implementing a lighting system or other kind of system.

In this or other applications, the bus 2 may comprise one or more lengths of cable between modules 6 and/or 8 on different circuit boards and/or housed in different units, which may be separated by multiple meters of the cable. For instance in a context such as a lighting system, the bus 2 may comprise multiple meters of cable connecting between the various intelligent luminaires 6. Such cabling may be particularly susceptible to disturbance, whether from the lighting itself (e.g. an interfering signal dues to pulse width modulation of the lighting or coded light data embedded in the light), or from other sources such as elevators, heating or air conditioning.

FIG. 2 shows the details of an individual master module 6. In embodiments each of the master modules 6 participating on the bus 2 may be configured as in FIG. 2. The master module 6 comprises a port 19 for connecting to the bus 2. Further, the master module 6 comprises bus communication logic 10 and a reset mechanism 20. The bus communication logic 10 is configured to communicate over the bus 2 according to the relevant bus protocol, e.g. $I^2C$. The reset mechanism 20 is configured to be able to reset at least the bus communication logic 10, 11 of its own and other modules 6, 8 as will be discussed in more detail shortly.

In an exemplary implementation, the master module 6 may comprise a processor 14 comprising one or more processing units or cores, and a memory 16 comprising one or more storage units or storage media. In embodiments the processor 14 and memory 16 may take the form of an embedded microcontroller, e.g. embedded in a luminaire 12, though in general no limit is placed on the size or type of the processor or memory. In such an implementation, some or all of the bus communication logic 10 and/or reset mechanism 20 may be implemented in the form of code stored on the memory 16 and arranged for execution on the processor 14 of the respective master module 6. For example the memory 16 may comprise a RAM into which code from a separate memory module (e.g. EEPROM) is fetched over the bus 2, and/or embedded non-volatile storage such as a boot ROM in which code is pre-stored.

Note therefore that "logic" or "mechanism" does not imply an implementation in dedicated hardware circuitry. In fact, in embodiments the reset mechanism 20 is implemented purely in software (i.e. using no hardware other than general purpose hardware of the processor 14 that would be present anyway in a processor not particularly implementing the techniques disclosed herein). In embodiments the bus communication logic 10 is also implemented at least partially in software. Nonetheless, in alternative implementations it is possible that some or all of the bus communication logic 10 and/or reset mechanism 20 could be implemented in dedicated hardware circuitry, or a configurable or reconfigurable circuitry such as a PGA or FPGA. In general logic or mechanism can refer to a soft or hard implementation.

Together the reset mechanisms 20 on the different master modules 6 form a distributed reset sub-system in accordance with embodiments of the present disclosure, examples of which will be discussed in more detail below.

The reset mechanism 20 of each intelligent master module 6 is equipped with a watchdog timer arranged to count out a watchdog timeout value. If the timer counts out the whole watchdog timeout value without detecting a condition relating to successful communication over the bus 2, then this is taken as indicative of an error and it triggers the multi-stage reset whereby the reset mechanism 20 first tries to reset its own module 6 and then tries at least one further reset (in embodiments at least resetting the bus 2). Each master module 6 is equipped with an instance of the reset mechanism 20 operating on the same principles as outlined herein (though where it is said "instance", it is not essential that the reset mechanism 20 on each module is absolutely identical as long as substantially the same principles are followed by each, at least as far as is relevant to the reset process of the present disclosure).

There are various possibilities for defining the start of the watchdog timer and the condition for triggering or withholding the reset. In one exemplary embodiment, the watchdog timer starts whenever the higher-level software on the respective master module 6 determines that it would like to send a message over the bus 2 but the bus is currently unavailable. For example the watchdog timeout value in this case may be 0.25 seconds (which is an order of magnitude longer than the maximum message length and therefore than the time that should be taken for a transaction to be performed by any other module 6 over the bus 2). If the bus is still unavailable after the watchdog timeout value has expired, e.g. after 0.25 seconds, then the respective reset mechanism 20 of the waiting master module 6 triggers the reset process. Thus the reset logic 20 triggers the reset if the respective master module 6 has to wait longer than the watchdog timeout value (e.g. 0.25 s) to transmit a message, which may be taken as indicative of the bus 2 being blocked. Otherwise the watchdog timer is reset when the respective module 6 successfully sends a message within the time limit.

In another embodiment, a reset is triggered if the reset logic 20 does not detect at least one valid pair of start-of-message and corresponding end-of message signals on the bus 2 within the watchdog timeout value. For example in this case the watchdog timer value may be set to two seconds. This could be implemented by starting the watchdog timer whenever the reset logic 20 hears a start-of-message signal on the bus 2, then triggering the reset process if it does not subsequently hear an end-of-message signal within the time limit. Alternatively the watchdog timer may run all the time, periodically, and at the finish of each time period the reset logic 20 determines how many start and end of message signals have been detected in that time—if there was not at least one start and end signal, the reset is triggered. Thus either way, the reset logic 20 triggers a reset if it has not heard at least one complete, valid message from another module 6, 8 within the watchdog timeout value (e.g. 2 s), which may be taken as indicative of the bus 2 being blocked, or of noise on the bus 2 having been misinterpreted as the start of a message (causing the respective module 6 and potentially other modules to wait indefinitely for a corresponding end-of-message that will never come).

In embodiments, multiple watchdog timers could be put in place at the reset logic 20 of each master module 6, so that a reset is triggered if any of the watchdog timers expires without the corresponding condition for detecting successful communication being met. E.g. so a reset may be triggered if any master module 6 either cannot send one of its own message for over 0.25 s, or does not hear a full valid message from any other module 6, 8 for over 2 s).

FIG. 3 provides a flow chart showing the operation of the bus communication logic 10 and reset mechanism 20 according to embodiments disclosed herein.

At step S10, before the rest of the process begins, each master module 6 is assigned a respective watchdog timer value. In embodiments the watchdog timeout value for each master module 6 may be made unique (amongst the other masters 6 participating on the bus 2) such that there is always one (and only one) master module 6 that can reset the bus 2. This may be desirable as, otherwise, multiple modules deciding to reset the bus at the exact same time may interfere with each other and may lead to unwanted behavior. The timeout values can be made unique for example based on the respective bus address (e.g. I²C address) of each master module 6 or the respective microcontroller serial number of each master module 6. The reset mechanism 20 on each master module 6 is configured to use its bus address or serial number to determine its respective unique watchdog timeout value as a function of that address or serial number, for example: timeout value=0.25 secs+(address*20 ms). However, it is not essential that the timeout values are unique—even with identical timeout lengths, with all masters being independent then the timeouts are likely not to be synchronized.

At step S20, the reset mechanism 20 starts the watchdog timer counting from the respective watchdog timer value. For example, this may be triggered when the higher-level software on the master module 6 has a message to send but the bus 2 is currently unavailable (or apparently unavailable) due to some other activity (or apparent activity) on the bus 2.

At step S30, the reset mechanism 20 determines whether the relevant success condition has been detected within the respective watchdog time. For example, if the bus 2 becomes available to transmit the respective master module's pending message before the expiry of the timeout, there is no need for a reset. If this is indeed detected, then the process loops back to step S20.

On the other hand, if the condition is not detected within the full watchdog timeout period, the reset process is triggered. According to the present disclosure, the reset is a multi-stage recovery process whereby each stage is attempted in turn only if the preceding stage fails to resolve the error. Resets will be performed on increasingly higher levels in order to attempt to reduce unwanted side-effects (loss of pending messages) at operational modules 6, 8. This way the bus 2 can be reset and recovered into an operational state regardless of which module 6, 8 is occupying the bus and causing the problem.

The recovery process begins at step S50. The master module 6 with the lowest watchdog timer value, e.g. the master with the lowest address, will be the module 6 that is the first to attempt the reset. In embodiments it will do this in three stages, as follows.

At S50 the reset mechanism 20 determines whether it has already attempted the first stage of the recovery process in response to the presently detected error (since the recovery itself process was last reset). If not, at step S60 the reset mechanism 20 proceeds to attempt the first (initial) reset stage, whereby it attempts to internally reset its own master module 6 (resetting at least the respective bus communication logic 10, though it is not excluded that other components or processes of the module 6 are reset as well). This local reset is the first, least severe resort as it will have no consequences on other bus participants 6, 8.

The process then loops back to step S20. If the local reset was successful, this can be detected as the respective module 6 will soon be able to perform or detect another successful communication over the bus 2 at step S30. The reset mechanism 20 also remembers which was the last (most recent) reset stage it attempted. Thus if successful, at step S40, the reset mechanism 20 also resets its memory of the last-attempted reset stage (i.e. so next time an error is detected it will start again from the initial, local reset stage S50, S60).

However, if a successful communication was still not performed or heard within the watchdog time period the second time around, the local reset may be deemed not to have worked. If this is the case, then the next time the process reaches step S50 the reset logic 20 will determine that it has already tried the local, internal reset, and so proceeds to step S70 where it determines whether it has already tried the second stage of the recovery process. If not the recovery process proceeds to step S80 where the reset mechanism 20 attempts the second reset stage. Thus if (and only if) the first reset stage was unsuccessful, the reset logic will attempt the second reset stage. In embodiments the second stage is a bus reset performed by applying a bus reset signal of the bus protocol onto the bus 2, e.g. in the case of an I²C bus this may comprise applying the standard I²C bus reset which is 9 pulses on the SCL (clock) wire. This will reset all I²C devices, including the slave or dumb modules 8. However, with a bus reset there is a risk of message loss when master modules 6 are reset at the exact moment they are preparing a message to be sent. Hence the bus reset is configured as a second, more severe resort following after the first stage only if the first stage was unsuccessful.

In embodiments, the process may then cycle around steps S20-S30 again to check whether the second reset stage was deemed successful (by checking for successful communication within a third instance of the watchdog timeout). If the second stage was found successful, the memory of the last-attempted reset stage will be reset at step S40 so that when another error is detected in the future, the process will start again from the first stage. If not successful however, the recovery process returns to step S70 where this time the reset logic 20 determines that the second stage has already been attempted in response to the current error, and so optionally may be configured to proceed to a third reset stage at step S90. Thus if (and only if) the second stage is unsuccessful, the reset mechanism 20 attempts the third stage.

In embodiments the third stage comprises a stage whereby the reset logic will attempt to reset any depending dumb modules 8 which it is specifically responsible (e.g. the modules of the same luminaire 12 in the example of FIG. 1a). This may comprises a reset via a reset pin of each depending dumb module 8. This stage may comprise a power cycle reset whereby the reset logic will attempt to power cycle depending dumb modules 8 (e.g. via a power reset pin of the dumb module 8). This will restore valid communication but has the highest risk of unwanted side effects, and hence is the third, most severe (and in embodiments last) resort. As an alternative to a power cycle, if the dumb device 8 has a 'communication interface' reset pin (e.g. I²C reset pin) that only resets the bus communication logic 11 of the respective dumb module 8 (and not a full power cycle), then that may be used as for the third stage reset. If an I²C reset pin or the like is available then that may be the preference for the third stage, whilst the power cycle reset may still be a final measure always available (e.g. as a fourth stage only the third stage fails).

These three (or four) levels of reset will be executed such that all master modules 6 first attempt an internal reset, before the first master module decides to attempt a full bus reset. For example if the different respective watchdog timer values of the master modules 6 are each 0.25 s in length but spaced 20 ms apart (timer value=0.25 s+address* 20 ms), and there are up to ten or so master modules 6 on the bus 2, then each master 6 will get a chance to reset itself internally before the 0.25 s watchdog timer on the first (e.g. lowest address) master module 6 times out for the second time around and that first module then attempts the bus reset. Similarly, if a third stage is included, each master 6 gets a chance to try the bus reset before the watchdog timer on the first times out for the third time and that module then attempts the pin and/or power reset.

Figure 5:
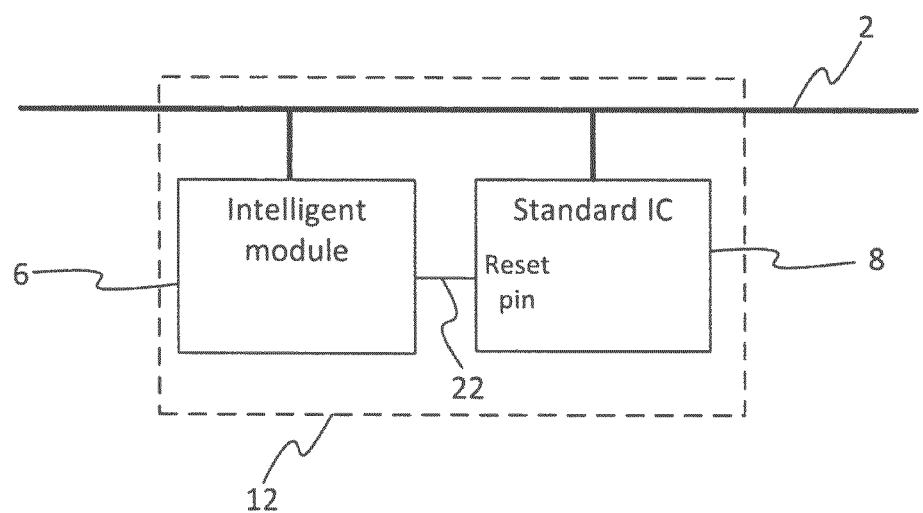
FIG. 5 is a schematic block diagram of a master and dependent slave.

In embodiments, the third stage may only be implemented where there are depending modules 8 that are adapted to be controlled by a respective master 6 by means of a separate control line, as disclosed below in relation to FIG. 5. As shown in FIG. 5, in embodiments each of one or more master modules 6 may be associated with a particular respective one or more of the slave or dumb modules 8 for which the master 6 is primarily responsible, e.g. being incorporated into the same unit such as the same luminaire 12 (see also FIG. 1*a*). The respective slave or dumb module(s) 8 may be said to be dependents of the respective master 6. For example the dependent slave or dumb modules 8 connected to the bus 2 may each comprise a standard I$^2$C block, and the master 6 may comprise a microcontroller.

Further, each dependent module 8 is connected to its respective master module 6 by a control line 22 that is separate from the bus 2. The control line 22 allows the respective master 6 to reset the communication interface 11 of its respective dependent modules 8. The control line 22 may be connected to a dedicated communication interface reset pin of the dependent module 8, or to the general reset pin of the dependent module 8, or to the power supply of the dependent module 8. Thus the master 6 is able to instigate a reset of the dependent module 8, either a dedicated communication interface reset (of the bus communication logic 11) or a power cycle reset (turning the power off and back on again). This will reset at least the bus communication logic 11 of the respective dependent module 8 (and in the case of a power cycle reset may also reset other logic of the dependent module 8). This kind of reset may be referred to as a hard reset, as opposed to the soft reset performed by signaling over the bus 2 as in the second stage. In embodiments, the hard reset is implemented as the third stage of the reset process, to be invoked only if the first two stages are unsuccessful.

Thus in case the communication interface 2, 11 is blocked, the dependent slave or dumb modules 8 can be reset, freeing up the interface and restoring normal operation. This provides the master module 6 with a further possibility for guarding the performance and reliability of the communication interface 2, 10, 11, to guarantee the communication interface is available after possible disturbances.

Such embodiments may allow for rapid development of modules for use within a lighting solution. The master module 6 with its reset mechanism 20 may be used to guarantee the performance and robustness of the communication interface 2, 10, 11; whilst the use of standard block(s) 8 allows for fast development. An additional advantage of such embodiments is that the intelligent master modules 6 only have to reset internally and any standard blocks 8 they can reset. As any intelligent master module 6 will reset itself in turn, there is no need for a global reset (this is preferred as a first resort, as a global reset may result in lost messages of devices that did not suffer from a communications failure).

FIGS. 4*a*-4*c* provide some simplified scenarios showing examples of the reset process in action. In the example system illustrated, there are four modules connected to the bus 2: a first module (i) which is a master, a second module (ii) which is a master, a third module (iii) which is a slave or other dumb module, and a fourth module (iv) which is a slave or other dumb module. The third module (iii) is a dependent of the first module (i), being connected together by a separate control line 22 as well as the bus 2. The fourth module (iv) is a dependent of the second module (ii), again the two being connected together by their own separate control line.

In scenario (a), the first module (i) is failing. At step T10, the second module (ii) tries an internal reset (stage 1), but does not resolve the issue. Module (ii) may have tried first for example because it has the lowest address. Subsequently, module (i) then tries an internal reset (stage 1) and does resolve the issue.

In scenario (b), module (iii) is failing (slave device connected to module i). At step U10, module (ii) tries an internal reset (stage 1) first, but does not resolve the issue. At step U20, module (i) tries an internal reset (stage 1) and still does not resolve the issue. Subsequently at step U30, module (ii) tries to reset the bus 2 (stage 2) and does resolve the issue.

In scenario (c), module (iii) is failing (slave device connected to module i), for example its clock output SCL is stuck low. At step V10, module (ii) tries an internal reset (stage 1), but does not resolve the issue. At step V20, module (i) then tries an internal reset (stage 1) and still does not resolve the issue. At step V30, module (ii) then tries to reset the bus (stage 2) and still does not resolve the issue. At step V40, module (i) tries to reset the bus 2 (stage 2) and still does not resolve the issue. Subsequently at step V50, module (ii) tries a hard reset of its depending module (iv) and still does not resolve the issue. Then finally at step V60, module (i) tries a hard reset of its depending module (iii) and at last does resolve the issue.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
    a bus;
    multiple master modules connected to the bus, each comprising respective bus communication logic operable to initiate a transaction over the bus, the bus communication logic being configured to detect a busy state of the bus, and in response to refrain from initiating a transaction until the busy state is cleared; and
    a distributed reset sub-system comprising an instance of a reset mechanism at each respective one of a plurality of the master modules, the reset mechanism at each respective master module being configured to recognize a timeout condition indicative of the detected busy state being due to error, and to perform a staged reset in response to recognizing the timeout condition;

wherein the staged reset first attempts a local reset which resets the respective bus communication logic of the respective master module, and determines whether the local reset clears the error, and if the local reset fails to clear the error, subsequently attempts one or more further resets to reset bus communication logic of one or more other modules connected to the bus.

2. The system of claim 1, wherein the bus comprises a cable between at least some of said master modules.

3. The system of claim 2, wherein the cable comprises an unshielded cable.

4. The system of claim 2, wherein at least some of the master modules each form part of a respective luminaire, being configured as a controller of the respective luminaire.

5. The system of claim 1 wherein the one or more further resets comprise at least: a reset which resets the bus communication logic of a plurality of the other modules connected to the bus.

6. The system of claim 5 wherein the one or more further resets comprise at least: a reset which resets the bus communication logic of all of the other modules connected to the bus.

7. The system of claim 1, wherein the one or more further resets comprise at least: a hard reset of one or more of the other modules connected to said bus, the hard reset comprising a power reset and/or a reset via a pin of each module being reset.

8. The system of claim 1, wherein the one or more further resets comprise at least: a reset which resets one or more dumb modules connected to the bus; the dumb modules being either slave modules, or master modules not equipped with an instance of said reset mechanism.

9. The system of claim 1, wherein the staged reset comprises at least a three-stage reset, the further resets comprising, in turn:

a soft reset which resets the bus communication logic of one or more of the other modules connected to the bus, by sending a reset signal over the bus; and subsequently, if the soft reset fails to clear the error, a hard reset of one or more of the other modules connected to said bus, wherein the hard reset comprises a power reset and/or a reset via a reset pin of each module being reset.

10. The system of claim 9, wherein the hard reset is signaled over a control line being separate from said bus.

11. The system of claim 1, wherein each of the master modules comprises a processor and the reset mechanism is implemented in software run on the processor.

12. The system of claim 1, wherein the reset mechanism of each respective master module is configured to use a respective unique timeout value to recognize said timeout condition, being unique amongst the multiple master modules connected to the bus.

13. The system of claim 12, wherein each of the respective unique timeout values is calculated using a number appearing in an address or serial number of the respective master module.

14. A first master module for use as one of multiple master modules connected to a bus, each comprising bus communication logic operable to initiate a transaction over the bus; wherein:

the respective bus communication logic of the first master module is configured to detect a busy state of the bus, and in response to refrain from initiating a transaction over the bus until the busy state is cleared;

the first master module comprises a reset mechanism configured to recognize a timeout condition indicative of the detected busy state being due to error, and to perform a staged reset in response to recognizing the timeout condition; and the staged reset first attempts a local reset which resets the bus communication logic of the first master module, and determines whether the local reset clears the error, and if the local reset fails to clear the error, subsequently attempts one or more further resets to reset bus communication logic of one or more other modules connected to said bus.

15. A computer program product for operating at least a first master module being one of multiple master modules connected to a bus, each comprising bus communication logic operable to initiate a transaction over the bus; the computer program product comprising code embodied on a computer-readable medium and configured so as when executed on a processor of the first master module to perform operations of:

implementing at least part of the bus communication logic of the first master module, including detecting a busy state of the bus, and in response causing the bus communication logic to refrain from initiating a transaction over the bus until the busy state is cleared;

recognizing a timeout condition indicative of the detected busy state being due to an error; and performing a staged reset in response to recognizing the timeout condition;

wherein the staged reset first attempts a local reset which resets the bus communication logic of the first master module, and determines whether the local reset clears the error, and if the local reset fails to clear the error, subsequently attempts one or more further resets to reset bus communication logic of one or more other modules connected to said bus.

16. The system of claim 1, wherein prior to said subsequently attempted operation, each of the plurality of master modules sequentially attempts a local reset to reset the respective bus communication logic; wherein upon a successful clearing of the error, the staged reset terminates.

* * * * *